United States Patent [19]

van Hatten

[11] 4,448,219
[45] May 15, 1984

[54] HEAT-INSULATING PIPE ELEMENT

[75] Inventor: Hendricus W. M. van Hatten, Vlissingen, Netherlands

[73] Assignee: AMGAS B.V., Middleburg, Netherlands

[21] Appl. No.: 461,946

[22] Filed: Jan. 28, 1983

[30] Foreign Application Priority Data

Jan. 28, 1982 [NL] Netherlands ......................... 8200319

[51] Int. Cl.³ .............................................. F16L 9/22
[52] U.S. Cl. ......................................... 138/149; 98/58
[58] Field of Search ................ 52/218; 98/46, 58, 59, 98/60; 110/184; 138/109, 114, 148, 149; 285/31, 47, 53, 138; 220/437, 445, 448, 452

[56] References Cited

U.S. PATENT DOCUMENTS

| | | | |
|---|---|---|---|
| 1,613,725 | 1/1927 | Sabin | 138/149 X |
| 2,451,146 | 10/1948 | Baker et al. | 138/149 |
| 2,650,180 | 8/1953 | Walker | 285/47 X |
| 3,842,721 | 10/1974 | Cardiff | 98/60 |
| 3,850,453 | 11/1974 | Bentley et al. | 285/47 |
| 3,865,145 | 2/1975 | McKay et al. | 138/149 X |

FOREIGN PATENT DOCUMENTS

| | | | |
|---|---|---|---|
| 517787 | 3/1953 | Belgium | 138/149 |
| 2073841 | 10/1981 | United Kingdom | 98/58 |

Primary Examiner—Stephen Marcus
Assistant Examiner—Mark Thronson
Attorney, Agent, or Firm—Watson, Cole, Grindle & Watson

[57] ABSTRACT

Heat-insulating pipe element of a pipe for conveying flue gases comprising a metal outer tube, a metal inner tube fitted co-axially in the outer tube by fixing means in a substantially immovable relation to the outer tube and a heat-insulating material being provided in the space between the tubes, whereby the fixing means comprises at least one elongate connecting element which is provided in longitudinal direction between the tubes and of which the extremities are connected with the respective end parts of the outer tube of which the central part is connected with the central part of the inner tube, and whereby the fixing means also comprises the insulating material, in the form of a continuous insulating layer, having a coherent, fibrous resilient structure.

5 Claims, 1 Drawing Figure

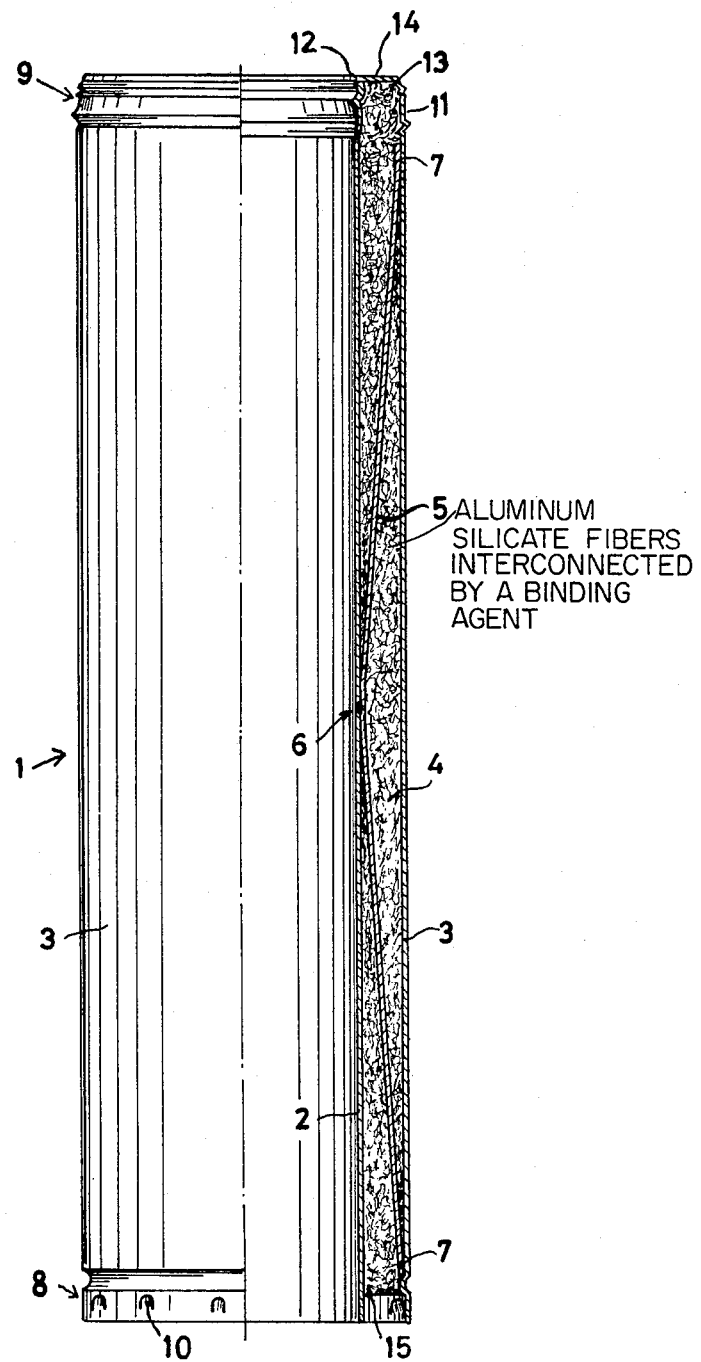

HEAT-INSULATING PIPE ELEMENT

BACKGROUND OF THE INVENTION

The present invention relates to a heat-insulating pipe element of a pipe for conveying flue gases comprising a metal outer tube, a metal inner tube disposed co-axially within the outer tube in spaced relation and secured thereto against relative axial movement, and a heat-insulating material located in the space between the tubes.

DESCIPTION OF THE PRIOR ART

A pipe element of the general type described above is disclosed in German Patent Application No. De-A-2,262,668. In this known pipe element, each extremity of the annular space between the co-axial tubes is closed off by a hardened, insulating annular layer or plug provided between the tube extremities and having a relatively small axial dimension. The space between the two plugs provided at the ends of the pipe element is filled with an insulating layer consisting of an incoherent, for example granular, material. The hardening agent used for hardening the plugs is of such a nature that, after having actually started using the pipe element, i.e. when effecting the initial increase in temperature, any binding existing between the plugs and the walls of the coaxial tubes is destroyed so that, due to the different axial expansions of the tubes, the coaxial tubes can axially move with respect to one another.

This known pipe element has the drawback that the co-axial tubes can move axially with respect to one another, as, consequently, also do the overall inner tube and overall outer tube of a complete pipe composed of a number of pipe elements. For a straight vertical pipe having for example a length of 20 meters, and the flue gas temperature being approximately 1000° C., the level of the upper end face of the overall inner tube may exceed the end face of the overall outer tube by as much as 40 cm. This may result in permanent deformation of the construction of the various pipe elements and thus of the pipe as a whole, which in turn leads to the dangerous situation in which flue gases may leak from the pipe at undesirable locations.

In addition, the known pipe element has the disadvantage that when the temperature of the flue gases to be conveyed is very high, for example when burning combustible particles deposited on the inner wall of the inner tube, which may occur in the event of flue gases originating from a wood or oil-fired heating source, the radial expansion of the inner tube may exceed that of the outer tube to such an extent, that the plugs will be jammed very tightly between said tubes, so that the mutual axial displacement of the inner and outer tubes becomes impossible. This may result in the plugs breaking and being dislodged from their attachment points and/or increases being formed in the inner tube. These serious kinds of damages to the pipe element or the pipe, which are of a permanent nature, can be such that the pipe element or the pipe will no longer for example meet legally required test specifications, which is even more serious since the damages are not visible from the outside.

A further drawback of such known pipe element is that the insulating layer provided between the plugs consists of a loose, for example granular, material, as a result of which the material will set (thicken) in the course of time, which results in a poorly heat-insulating air chamber between the layer and the plug located thereabove. This drawback cannot be eliminated by additional compacting of the intermediate layer during manufacture, since as a result during utilization of the pipe element and due to the radial expansion of especially the inner tube, the frictional resistance of the pipe element with the inner tube will increase as well as the likelihood of permanent deformation of the inner tube in particular.

SUMMARY OF THE INVENTION

It is therefore a main object of the present invention to eliminate the drawbacks of the aforedescribed known pipe element.

To this end, the invention provides a pipe element of the aforementioned type wherein the means utilized for fixedly mounting the inner tube comprises at least one elongate connecting element which is provided in longitudinal direction between the tube members and of which the end parts are connected with the respective end parts of the outer tube and of which the central part is connected with the central part of the inner tube, while the fixing means also comprises the insulating material in the form of a continuous insulating layer having a coherent, fibrous resilient structure. Thus, the center of the inner tube is always fixed with respect to the outer tube, while the axial expansion of the inner tube is evenly distributed toward either side of the center thereof. The insulating layer ensures the mutual centering of the tubes, and, the layer being resilient, the tubes can expand radially without damaging the layer, while the frictional resistance thereof with the inner tube will be relatively low, thus precluding the formation of creases in the inner tube.

Since the inner tube is centered within the outer tube by means of the insulating layer, it will be sufficient to provide for a single elongate connecting element which may be formed by an inexpensive wire or narrow strip, as it is mainly subjected to tensile load.

Even in the event of a high temperature of the flue gases occurring, the pipe element of the invention will not deform, thus ensuring a permanent, leakproof flue gas conveyance. Further, the thermal resistance between the tubes will be substantially uniform over the entire length of the pipe element and, because of the coherent character of the insulating layer, will remain unaltered even after a long period of service and in any position of the pipe element.

The connecting element is preferably rigid and the portions on either side of the central part thereof are bent to the outer tube. This affords assembling the pipe element in a simple manner, because, for instance, firstly the central part of the connecting element is joined to the central part of the inner tube, whereupon this assembly is pushed into the outer tube and subsequently the extremities of the connecting element are joined to the end parts of the inner tube, so that the connecting element can be fitted into place in a simple manner without using special tools.

If the pipe element is provided with complementary end parts for coupling same to corresponding complementary end parts of another pipe element, the insulating layer preferably extends, at at least one of the end parts of the pipe element, so far in a direction from the other end part that, for coupled pipe elements with complementary end parts, it is resiliently compressed by the insulating layer of the other pipe element. This will always ensure that the insulating layer of one pipe element of a pipe comprised of a number of pipe elements is properly united with the insulating layer of the other pipe element connected thereto, so that there will be no air chamber between the respective insulating layers, thus assuring a high thermal resistance of the inner tubes to the outer tubes in this border area also.

DESCRIPTION OF THE DRAWING

In the drawing an embodiment of the respective pipe element is shown.

DESCIPTION OF THE PREFERRED EMBODIMENTS

The drawing is a view of a pipe element 1, half of which is a sectional view in longitudinal direction. The pipe element 1 comprises an inner metal tube 2, for example of stainless steel, and an outer metal tube 3, for example of stainless steel, a heat-insulating layer 4 being provided therebetween. The insulating layer 4 consists of a material having a coherent fibrous structure and is preferably formed of aluminum silicate fibres, which after being mixed with a binding agent, form a coherent and resilient sleeve between the tubes. In such an embodiment of the insulating layer 4, the tubes 2, 3 will be resiliently mutually centered by the layer 4.

For the purpose of mutually fixing the tubes 2, 3 in the longitudinal direction, at least one elongate connecting element 5 is provided within the space available between the tubes 2, 3 and in the longitudinal direction thereof. The connecting element 5 is, in the central part thereof, connected to the central part of the inner tube 2. If the connecting element 5 comprises a metal strip or wire, this connection can be made easily and inexpensively by spot welding. The extremities of the connecting element 5 are connected at 7, in the vicinity of the axial end parts of the pipe element 1, with the outer tube 3. These connections may be screwed connections or blind-riveted connections, but are preferably formed with hooked connections, whereby a complementary mounting part has been provided at 7 on the inner side of the outer tube 3, and whereby each of two hooks or lugs provided at the opposite extremities of the connecting element 5 or recesses formed therein or complementarily pressed-in teeth cooperates with the opposed complementary mounting part of the tube 3.

If the connecting element 5 is joined to the inner tube 2 at 6 by means of spot welding, the half side portions thereof are bent to the outer tube 3 and the connections at 7 are hooked connections, a pipe element is thus obtained which is simple and inexpensive to manufacture, because after the spot-welding operation the assembly formed by the inner tube 2 and the connecting element 5 can be pushed into the outer tube 3, whereupon the hooked connections can be easily established.

The tubes 2, 3 can be interconnected by means of a number of connecting elements 5 spaced apart. Since, however, the insulating layer 4 has a coherent fibrous structure, it is, depending on the length/diameter ratio, sufficient for the pipe element 1 to comprise only one connecting element 5.

The pipe element 1 is provided with complementary end parts 8 and 9, respectively, of which the end part 8 of a pipe element of a pipe can be fitted over the end part 9 of another pipe element or of a similarly formed coupling member, so that with respect to rain water an outward run-off joint having a water seal formed by ridges is obtained. Inwardly pressed lips 10 of the outer tube 3 at the end part 8 will thereby engage the edge of a groove 11 formed in the end part 9 of the outer tube 3. Bending back the lips 10 enables the connection to be broken easily by pulling the pipe elements apart.

At one extremity, e.g. at 9, the inner tube 2 is disposed somewhat radially outwardly, so that, when inserting one pipe element into another pipe element, the inner tube 2 of one pipe element slides into that of the other pipe element, so that with respect to internally condensed water, an inward run-off joint having a water seal formed by ridges is obtained. Because the dimensions of the two inner tubes 2 to be joined correspond accurately and as only resilient material has been provided between the tubes 2, 3, the connection of the two inner tubes 2 will be sufficently gastight.

With regard to the axial expansion occurring at higher temperatures, in addition the complementary end parts are formed preferably in such a manner that the inner tubes 2 can move freely longitudinally within a mutual complementary coupling over approximately 2% of the length of a pipe element 1. It should be noted that the total axial expansion of an inner tube 2 is halved symmetrically with respect to the attachment point 6 of the connecting element 5.

In order to prevent an air chamber from being formed in the joining area of two pipe elements, which would reduce the thermal resistance of the inner tubes 2 to the outer tubes 3, the insulating layer 4 at the end part 9 extends at least to the end edges 12, 13 of the tubes 2, 3 and extends in the direction to the end part 8 so far, that the end faces 14 and 15, respectively, of two pipe elements to be joined, touch one another, and that the insulating material is preferably compressed somewhat in that area.

The quality of the pipe element according to the invention is such that it meets very stringent standards such as DIN 18160 part 6, DIN 18150 part 2, and DIN 4102 part 4.

What is claimed is:

1. A heat-insulating pipe element of a pipe for conveying flue gases, comprising, an elongated metal inner tube, an elongated metal outer tube surrounding said inner tube in spaced relation and coaxial therewith, said tubes defining an annular space therebetween, a continuous layer of insulating material, having a coherent, fibrous resilient structure, located within said annular space in contact with both said tubes for resiliently maintaining a coaxial relationship therebetween, at least one elongated connecting element disposed within said annular space for securing said tubes together against relative axis movement, said element being connected to said tubes at only three locations and having only a central portion thereof connected with a central portion of said inner tube, and having only opposite end portions thereof connected with end portions of said outer tube.

2. Pipe element according to claim 1, wherein said insulating layer consists of aluminum silicate fibres which are interconnected by means of a binding agent.

3. Pipe element according to claim 1, wherein said connecting element is rigid and the portions on opposite sides of said central part thereof are resiliently bent from said inner tube toward said outer tube.

4. Pipe element according to claim 1, wherein said end portions of said connecting element are joined to the outer tube by means of a hooked connection.

5. Pipe element according to claim 1 having complementary end parts for coupling same to corresponding complementary end parts of another pipe element, wherein said insulating layer extends, at at least one of the end portions of said outer tube, so far in the direction from the other of the end portions thereof that, when coupled with another pipe element with complementary end portions, it is resiliently compressed by the insulating layer of another pipe element.

* * * * *